(12) United States Patent
Hanada et al.

(10) Patent No.: US 6,965,487 B2
(45) Date of Patent: Nov. 15, 2005

(54) CONTROLLER FOR INFORMATION RECORDING AND REPRODUCING DEVICE AND CONTROL METHOD FOR THE INFORMATION RECORDING AND REPRODUCING DEVICE

(75) Inventors: Kazuyoshi Hanada, Hadano (JP); Osamu Beppu, Oiso (JP)

(73) Assignee: Hitachi Global Storage Technologies Japan, Ltd., Kanagawa-ken (JP)

( * ) Notice: Subject to any disclaimer, the term of this patent is extended or adjusted under 35 U.S.C. 154(b) by 262 days.

(21) Appl. No.: 10/245,385

(22) Filed: Sep. 18, 2002

(65) Prior Publication Data

US 2003/0197967 A1    Oct. 23, 2003

(30) Foreign Application Priority Data

Apr. 17, 2002  (JP) .............................. 2002-115104

(51) Int. Cl.[7] .......................................... G11B 15/18
(52) U.S. Cl. ...................................................... 360/69
(58) Field of Search ........................ 360/69, 75, 99.08; 369/53.18; 340/3.42, 686.1; 701/51, 1, 200, 701/29, 33; 711/112; 380/200; 348/148

(56) References Cited

U.S. PATENT DOCUMENTS

| 4,688,244 A | * | 8/1987 | Hannon et al. ................ 377/58 |
| 4,812,838 A | * | 3/1989 | Tashiro et al. .............. 340/3.42 |
| 4,891,760 A | * | 1/1990 | Kashiwazaki et al. ...... 701/200 |
| 5,467,277 A | * | 11/1995 | Fujisawa et al. ............... 701/51 |
| 6,154,689 A | * | 11/2000 | Pereira et al. .................. 701/1 |
| 6,175,786 B1 | * | 1/2001 | Takakura et al. ............. 701/29 |
| 6,204,772 B1 | * | 3/2001 | DeMay et al. ............ 340/686.1 |
| 6,335,910 B1 | * | 1/2002 | Yoshizawa et al. ...... 369/53.18 |
| 6,546,456 B1 | * | 4/2003 | Smith et al. ................. 711/112 |
| 6,633,448 B1 | * | 10/2003 | Smith et al. ................... 360/69 |
| 6,771,447 B2 | * | 8/2004 | Watanabe et al. ............. 360/69 |
| 2002/0021512 A1 | | 2/2002 | Nagaki et al. |

FOREIGN PATENT DOCUMENTS

| EP | 962928 A1 | * | 12/1999 | ........... G11B 19/04 |
| JP | 2001-57010 | | 2/2001 | |
| JP | 2001-332049 | | 11/2001 | |
| KR | 1996-24901 | | 7/1996 | |

* cited by examiner

*Primary Examiner*—David Hudspeth
*Assistant Examiner*—K. Wong
(74) *Attorney, Agent, or Firm*—Mattingly, Stanger, Malur & Brundidge, P.C.

(57) ABSTRACT

A control device for preventing abrasion inside bearings in an information recording and reproducing device mounted on an automobile and preventing degradation in rotational accuracy, the information recording and reproducing device including disk media holding information, heads for recording or reproducing information from the disk media, a carriage for turning to position the heads on surfaces of the disk, a bearing part permitting the carriage to turn, a spindle motor for rotatingly driving the disk media, and a bearing part of the spindle motor, the control device comprising a detecting unit for detecting a vehicle operating manner, which is carried out before vehicular vibrations are caused, and a control unit for starting rotation and/or starting swings the bearing part of the spindle motor and/or the bearing part of the carriage on the basis of a signal from the detecting unit.

9 Claims, 5 Drawing Sheets

CONTROLLER FOR INFORMATION RECORDING AND REPRODUCING DEVICE AND CONTROL METHOD FOR THE INFORMATION RECORDING AND REPRODUCING DEVICE

FIELD OF THE INVENTION

The Invention relates to a controller for an information recording and reproducing device and a control method for the information recording and reproducing device in the case where the information recording and reproducing device including a magnetic disk device is loaded on a vehicle and a prevention techniques of micro-movement abrasion in the bearing part of an information recording and reproducing device.

BACKGROUND OF THE INVENTION

In conventional information recording and reproducing devices, there has been commonly used, as disclosed in Japanese Patent Laid-Open No. 57010/2001, a method, in which a temperature sensor is used to sense an ambient temperature, feeding electric power to a CPU when the ambient temperature is low, raising temperature of an information recording and reproducing device by temperature rise of the CPU, starting up the information recording and reproducing device in a state, in which temperature of the information recording and reproducing device comes in a temperature range of certified level at the time of operation, and reversely using a cooling fan to cool the information recording and reproducing device when the ambient temperature is high.

Also, information recording and reproducing devices of the prior art are arranged and used in a room where air conditioning is complete.

Further, Japanese Patent Laid-Open No. 332049/2001 discloses a method of preventing fletching abrasion (abrasion of rolling surfaces caused by minute vibrations) of spindle bearings in a magnetic disk device of load/unload type. Concretely stated, with the devices of load/unload type, a slider is free from contacting with a disk and thereby stopping, and so when an external shock is applied, a spindle motor is placed under no restraint and increased in freedom of rotation to cause fletching abrasion. In order to prevent such fletching abrasion, an anti-adhesion film is coated on a slider or a CSS (Contact Start and Stop) zone is provided on a disk so that a slider is caused to contact with the disk and stop and freedom of rotation is placed under restraint through a disk when a spindle motor stops.

Recently, giving and receiving of information has been made in automobiles through the medium of satellites and other information equipments as adopted in on-board navigation systems or the like, and transmission and reception of mails are made possible from unspecified places by means of mobile telephone. In the future, an amount of information in such on-board navigation systems, mobile telephones or the like will be more and more increased, and the degree of necessity for information recording and reproducing devices for recording and reproducing such information has been more and more increased.

Hereupon, an information recording and reproducing device is loaded in an automobile whereby it becomes possible in a navigation system to make a high-speed response and update information at any time through the medium of satellites or the like and to make download of a large amount of information. Also, a large amount of information such as Internet or the like can be handled with an information recording and reproducing device loaded in an automobile.

Conventionally, it is general that the operating environment of an information recording and reproducing device is such that the device is placed in an air-conditioned room and mounted in a housing provided with a cooling fan to be free from vibrations from outside, and temperature of the operating environment is in the order of 0° C. to 50° C.

In contrast, with on-board information recording and reproducing devices, it is necessary to take into consideration that an interior of an automobile is raised to 100° C. when left under hot midsummer sky and lowered to −40° C. in cold districts, and it is demanded to operate normally under an environment in an automobile subjected to vibrations.

In particular, no consideration has been given to a phenomenon that micro-movement abrasion is caused in bearings used for rotational driving of a rotating section, in a state that, rotating sections of the information recording and reproducing devices, a spindle motor and a carriage, for example stop under an environment, in which such rotating section stops, under an environment, in which vibration is continuously applied to, the information recording and reproducing device, and therefore the rotational accuracy is rapidly degraded. Concretely stated, when vibration is applied from outside, balls continuously collide against inner and outer races in the case of ball bearings, and a shaft continuously collides against a hub in the case of fluid bearings.

The invention discloses a control mechanism, a control method and other related techniques, in which bearings in information recording and reproducing devices loaded on vehicles, for example, automobiles are prevented from internal abrasion and degradation in rotational accuracy is prevented.

SUMMARY OF THE INVENTION

In order to solve the problems, the invention mainly provides the following constitution and function.

The constitution comprises an on-board information recording and reproducing device including disk media holding information, heads for recording or reproducing information from the disk media, a carriage turning to position the heads on surfaces of the disk media, a bearing portion permitting the carriage to turn, a spindle motor for rotatingly driving the disk media, and a bearing part of the spindle motor, and a control device comprising detecting means for detecting a vehicle operating manner, which is carried out before vehicular vibrations are caused, and control means for starting rotation and/or starting swings the bearing part of the spindle motor and/or the bearing part of the carriage on the basis of a signal from the detecting means.

Also, the constitution comprises an on-board information recording and reproducing device including disk media holding information, heads for recording or reproducing information from the disk media, a carriage turning to position the heads on surfaces of the disk media, a bearing part permitting the carriage to turn, a spindle motor for rotatingly driving the disk media, and a bearing part of the spindle motor, and a control device comprising an acceleration sensor provided on a vehicle or the information recording and reproducing device, detecting means for detecting whether an acceleration from the acceleration sensor has exceeded a predetermined value, and control means for starting rotation and/or starting swings the bearing part of the spindle motor and/or the bearing part of the carriage on the basis of a signal from the detecting means.

Also, the constitution comprises an on-board information recording and reproducing device including disk media holding information, heads for recording or reproducing information from the disk media, a carriage turning to position the heads on surfaces of the disk media, a bearing part permitting the carriage to turn, a spindle motor for rotatingly driving the disk media, and a bearing part of the spindle motor, and a control device comprising a velocity sensor existing in a vehicle, detecting means for detecting output from the velocity sensor, and control means for starting rotation and/or starting swings the bearing part of the spindle motor and/or the bearing part of the carriage on the basis of a signal from the detecting means.

With the above-mentioned constitution, micro-movement abrasion in the bearing part or parts used for rotating and/or rotatingly driving the spindle motor and/or the carriage can be prevented, and rotating and/or turning accuracy can be prevented from being rapidly degraded.

DESCRIPTION OF THE PREFERRED EMBODIMENTS

Figure 1:
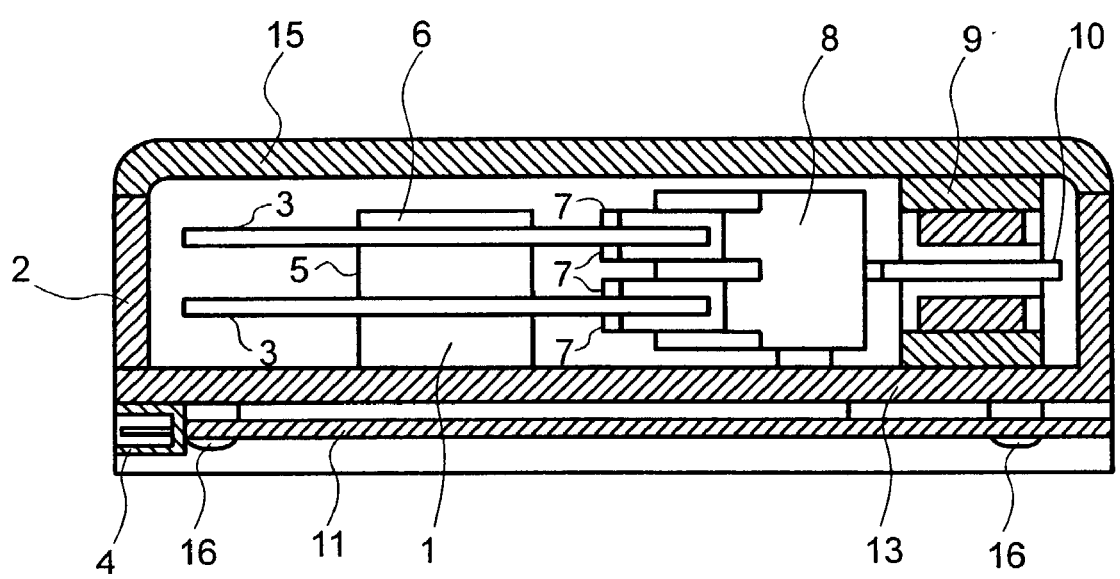
FIG. 1 is a cross sectional view showing an entire constitution of an information recording and reproducing device according to an embodiment of the invention.
Figure 2:
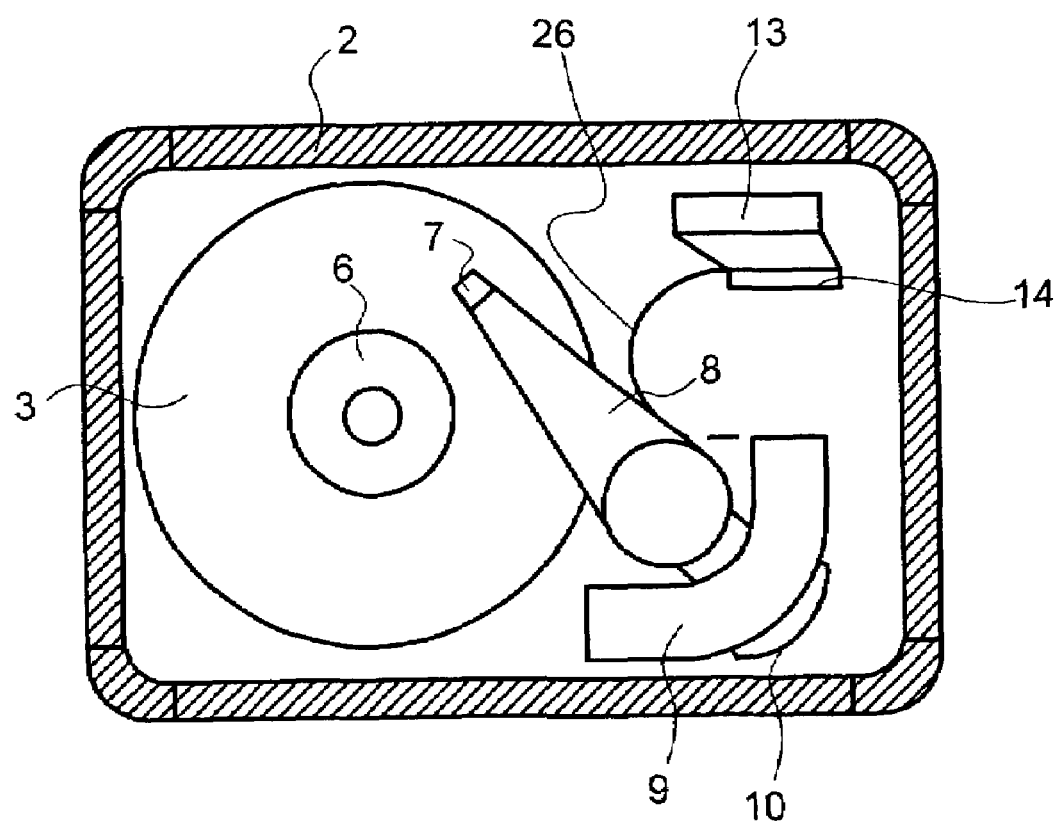
FIG. 2 is a plan view showing the entire constitution of the information recording and reproducing device according to the embodiment of the invention.
Figure 3:
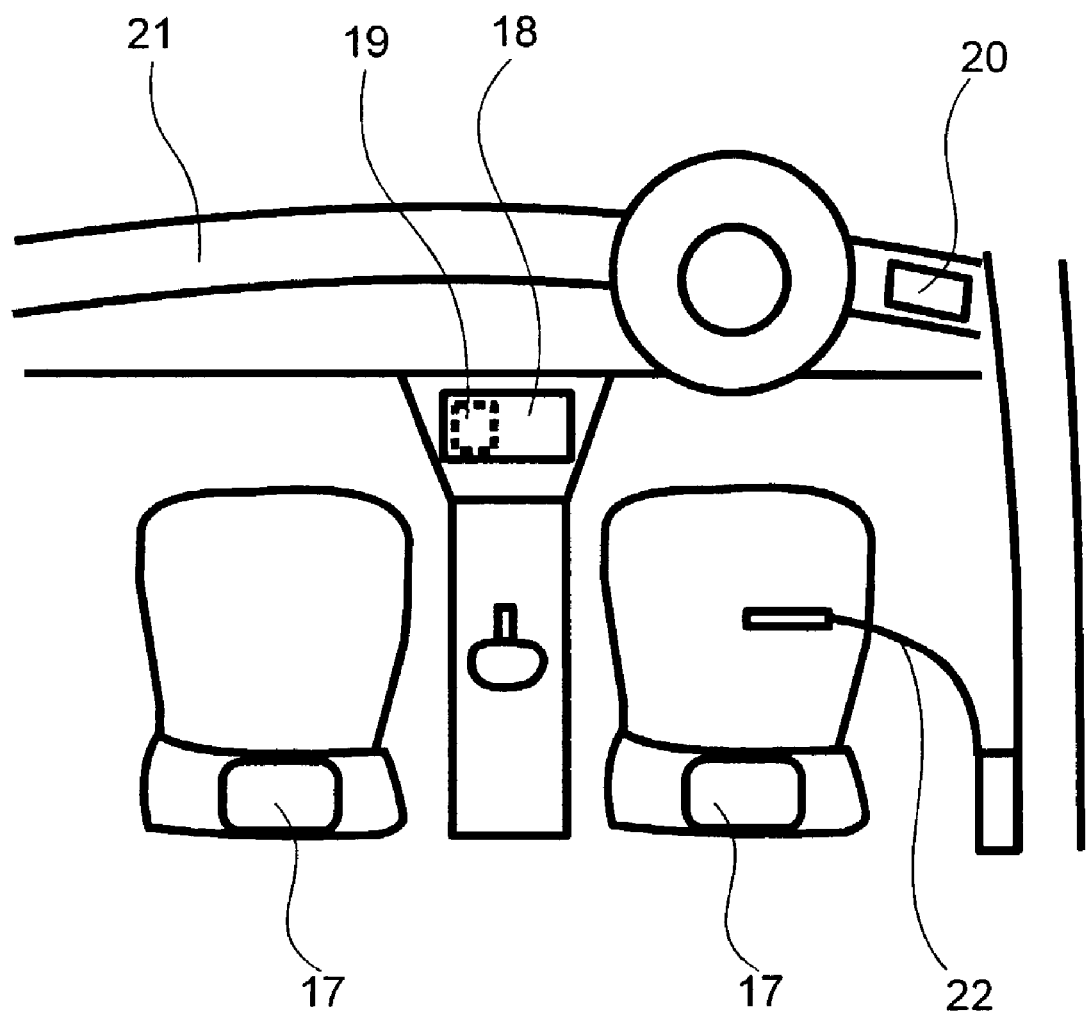
FIG. 3 is a mounting drawing of a state, in which the information recording and reproducing device according to the embodiment is loaded on an on-board navigation system.
Figure 4:
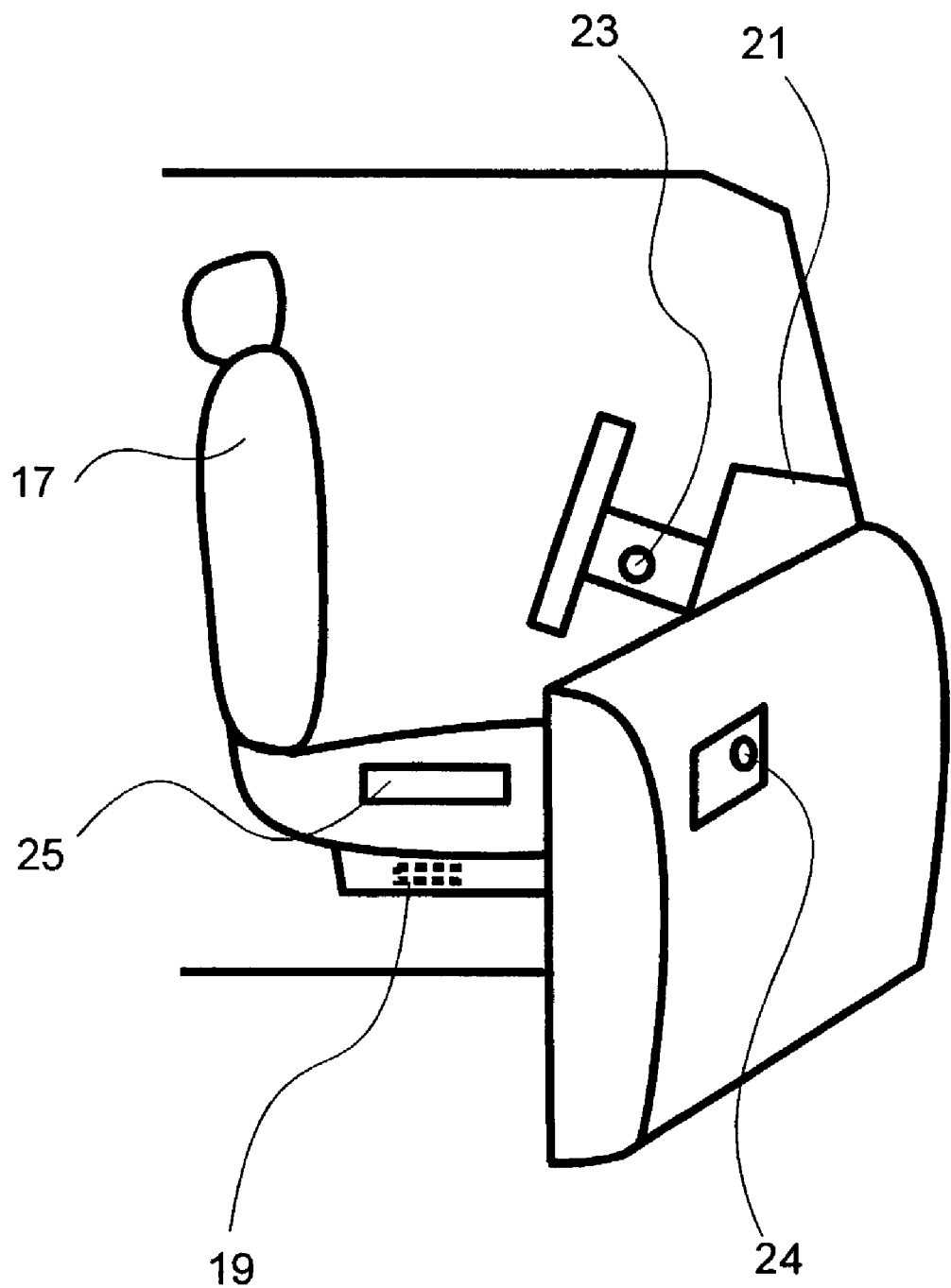
FIG. 4 is a schematic view illustrating a manner, in which an information recording and reproducing device loaded under a seat, according to the embodiment is started up.
Figure 5:
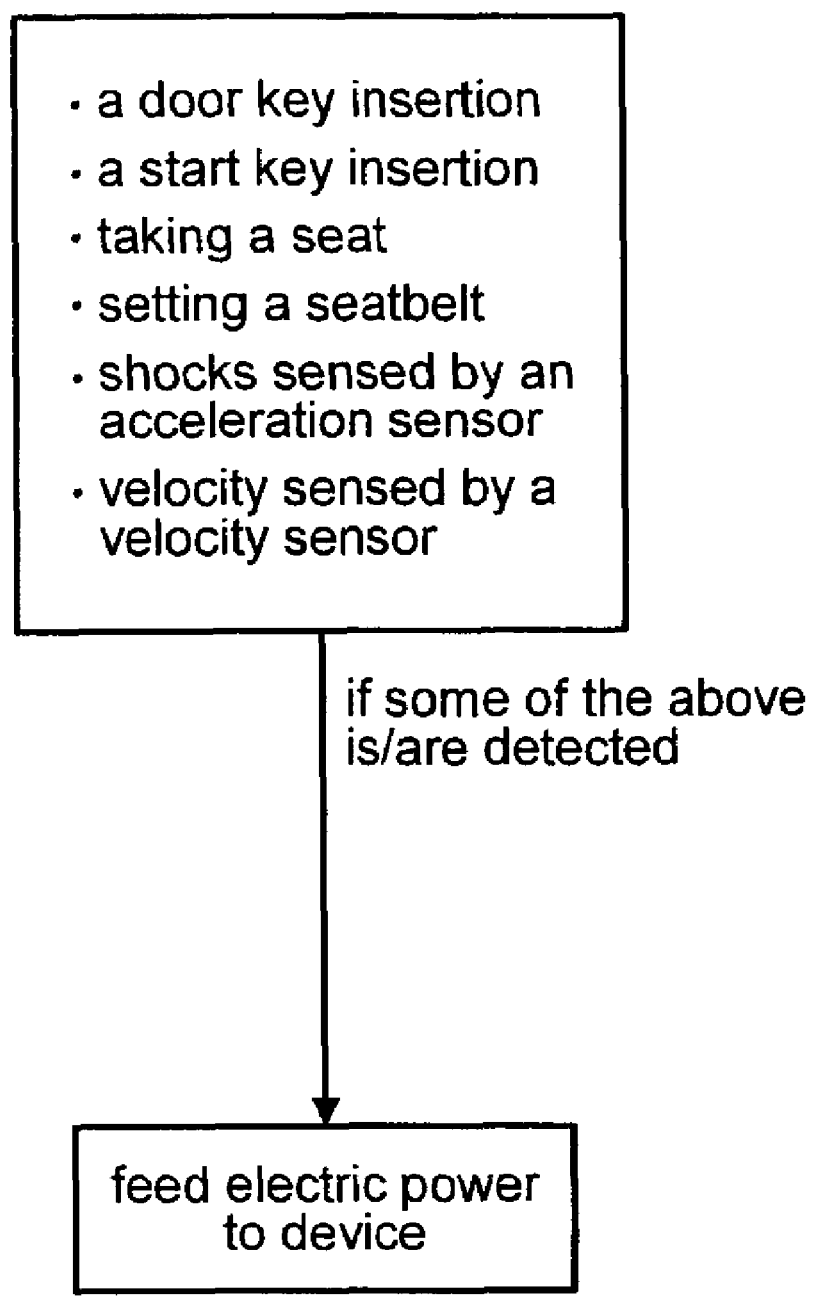
FIG. 5 is a view illustrating a manner, in which an on-board information recording and reproducing device according to the embodiment is started up.

An information recording and reproducing device according to embodiments of the invention will be described in detail with reference to FIGS. 1 to 5. FIG. 1 is a cross sectional view showing an entire constitution of an information recording and reproducing device according to an embodiment of the invention. FIG. 2 is a plan view showing the entire constitution of the information recording and reproducing device according to the embodiment of the invention. FIG. 3 is a mounting drawing of a state, in which an information recording and reproducing device according to the embodiment is loaded on an on-board navigation system. FIG. 4 is a schematic view illustrating a manner, in which an information recording and reproducing device loaded on an automobile, is started up. FIG. 5 is a view illustrating a manner, in which an information recording and reproducing device loaded on an automobile, is started up.

With reference to FIGS. 1 and 2, a fundamental construction of a magnetic disk device being an example of an information recording and reproducing device according to the embodiment will be described below. Disks 3 composed of magnetic films formed on surfaces of a substrate material such as aluminum or glass are rotatingly driven by a spindle motor 1 to permit information to be magnetically recorded or reproduced. The spindle motor 1 comprises a hub (not shown), on which the disks 3 are stacked, and a disk clamp 6 for securing the disk 3 to the hub, and rotates the hub through bearings (not shown) on a motor shaft provided on a base 2.

The magnetic disk device comprises magnetic heads 7, which are caused to float above surfaces of the disks 3, rotatingly driven by the spindle motor, with a gap of several nm to several tens of nm therebetween, and include a magneto resistive effect element or an electromagnetic coil for magnetically writing or reading information, and a carriage 8 formed from a material such as aluminum or magnesium and serving to correctly position the magnetic heads 7 on the surfaces of the disks 3. The carriage 8 mounting thereon the magnetic heads 7 is driven and positioned by a voice coil motor 9 comprising a coil 10 in the form of a winding of an aluminum wire material or a copper wire material, which are covered by an insulating film, a magnet (not shown) being a permanent magnet, and a yoke (not shown) supporting the magnet to form a magnetic circuit.

Like the spindle motor 1, the carriage 8 also rotates on a carriage shaft (not shown) provided on the base 2 through bearings. A signal at the time of reading and writing by the magnetic heads 7 is transmitted in a reading action to a FPC (flexible printed board) 26 (FIG. 2) through the carriage 8 from magneto resistive effect elements (not shown) provided on the magnetic heads 7, and to an outside of a HDA (head disk assembly) through a read/write control IC 14 (FIG. 2), which controls a signal at the time of reading and writing by the magnetic heads 7, by a hermetical connector 13, which is positioned on an underside of the IC 14, formed from a material such as aluminum, stainless steel or iron, and bonded to the base 2. In the writing action, a signal from a high order device is transmitted in a reverse order to the above one to be written onto the disks 3 by electromagnetic coils in the magnetic heads 7. Here, the hermetical connector 13 serves to intermediate electric signals inside and outside the HDA, in which hermetical connector a plurality of pins for transmission of signals and a molded portion supporting the pins are completely closed. In addition, the reference numeral 4 denotes an interface connector, and 16 substrate-securing screws.

Also, a drive current in the coil 10 on the voice coil motor 9 is transmitted to the hermetical connector 13 via the FPC 26. A drive current in the spindle motor 1 is transmitted to the hermetical connector 13 through a motor FPC (not shown) leading to the spindle motor 1. The hermetical connector 13 is connected to a main substrate 11 (FIG. 1) provided outside the HDA so that electronic parts provided on the main substrate 11 perform various control on the magnetic disk device. In addition, the main substrate 11 may be provided inside the HDA.

Shafts of the spindle motor 1 and the carriage 8, and the voice coil motor 9, respectively, are fixed to the base 2 by means of screws, and a cover 15 formed from a material such as aluminum, stainless steel or iron is mounted on the base 2 with a packing (not shown) therebetween to keep closeness.

In order to correctly process signals in a state, in which information is written or read between the heads 7 and the disks 3, debris must not enter spaces between the heads and the disks to hinder magnetic paths, and so the HDA constructed in the above-mentioned manner must be maintained clean at all times and is provided with an inner filter (not shown) so that dust be caught by an air circulating system in the HDA, which is produced by revolutions of the disks 3.

Also, since the high volume magnetic disk device mounts therein a plurality of disks 3 to ensure storage capacity and the heads 7 are provided to face the disks 3, disk spacers 5 (FIG. 1) are provided between the disks 3. Also, spacings between the heads 7 are kept constant by finishing head mounting surfaces of the carriage 8 with good accuracy.

Motion and manner of the on-board information recording and reproducing device according to the embodiment of the invention will be described below. FIG. 3 shows an example, in which an information recording and reproducing device 19 being a magnetic disk device as an example is mounted in an on-board navigation system 18, and FIG. 4 shows an example, in which the information recording and reproducing device 19 is mounted under a vehicle seat 17.

According to the embodiment of the invention, before an engine in a vehicle is started up to generate vibrations, bearing parts of the information recording and reproducing device 19, for example, a bearing part or parts of the spindle motor and/or the carriage are rotatingly started up. This starting of rotation can prevent minute vibrations attributable to successive collisions in the bearing part. In other words, even when vibrations are caused by the engine, minute vibrations will not be generated in the bearing part provided that the disks 3 or the like rotate.

Here, an example of a method of starting rotation of bearing parts of the information recording and reproducing device 19 before starting an engine in a vehicle, an example of which is an automobile, to cause vehicular vibrations comprises detecting a state, in which a key is inserted into a door key hole 24 shown in FIG. 4, and beginning feeding electric power to the information recording and reproducing device 19 on the basis of such detecting. Another example of such method comprises detecting a state, in which a key is inserted into a vehicle power start keyhole 23, and beginning feeding electric power to the information recording and reproducing device 19 on the basis of such detecting.

Also, a point of contact 25 for detecting seating is provided on a seating portion of a seat 17 as shown in FIG. 4 to detect a person seating whereby electric power begins to be fed to the information recording and reproducing device 19 under the seat. Further, according to an embodiment of the invention, binding of a seat belt 22 is detected, on the basis of which electric power begins to be fed to the information recording and reproducing device 19.

Thus starting rotation of the bearing parts before a vehicle starts an engine to cause vibrations leads to starting rotation of the bearing parts before the information recording and reproducing device 19 is subjected to vibrations.

Further, in another constructional example as shown in FIG. 5, an acceleration sensor (not shown) is mounted irrespective of whether it is mounted in the information recording and reproducing device 19 or outside the same, and output of the acceleration sensor above a predetermined level is sensed to rotate the spindle motor 1 irrespective of whether a signal processing circuit in the device is effective or non-effective. In this case, a point of time when a predetermined level or higher is detected by the acceleration sensor is in many cases after vibrations have been caused by the engine starting. However, in preventing micro-movement abrasion in the bearing part of the spindle motor, it is also effective to rotate the spindle motor after the acceleration sensor detects vibrations due to departure of a vehicle after the starting of an engine. That is, it can be said that a period of time elapsed from the starting of an engine to departure of a vehicle is not so long and permissible in terms of micro-movement abrasion. In this manner, a predetermined effect is obtained when the spindle motor is rotated before a vehicle begins movement. Hereupon, in the case where an acceleration sensor is mounted on a vehicle door, detecting by the acceleration sensor above a predetermined level is made by opening and closing of the door whereby the spindle motor can be rotated before the starting of an engine.

Also, a still further constructional example comprises a mount member (not shown) for the information recording and reproducing device 19, having the function of damping vehicular vibrations and provided with a damping member (not shown), which is formed from rubber, plastic molding or the like to be arranged between a vehicle and the information recording and reproducing device 19, in order to lessen acceleration applied to the information recording and reproducing device 19.

Also, a velocity sensor having been installed in a vehicle may be made use of to detect vehicular velocity to thereby rotate the spindle motor 1, and the spindle motor may continue to be rotated at all times during detecting of velocity even when the information recording and reproducing device is in non-use.

Various detecting manners described above and shown in FIG. 5 include, in relation to a point of time when a vehicular engine is started, one, in which detecting is made before the start of an engine, and one, in which detecting is made immediately after the start of an engine. These detecting manners are not in fixed relationship with a point of time when an engine is started. That is, a manner, in which bonding of a seat belt is detected, is in some cases before or immediately after the start of an engine, and a manner, in which insertion of a door key is detected, is immediately after the start of an engine in the case where the engine is started from a remote location.

As shown in FIG. 3, a solar cell 20 provided on a dashboard 21 may be used to store electricity in the daytime, and the stored electricity may actuate the information recording and reproducing device 19. At this time, the solar cell 20 may be mounted anywhere fully exposed to sunlight. In this case, electric power can be fed to the information recording and reproducing device 19 even before the starting of an engine to make information processing in the information recording and reproducing device. That is, in the case where an engine is started with a short interval after a door is opened and seating is effected, the use of a solar cell instead of using a battery on a vehicle is effective in ensuring a capacity of the battery in a manner, in which insertion of a door key into a door key is detected to rotate the spindle motor. It is fundamental in this embodiment that detecting of insertion of a door key causes a battery on a vehicle to be used in rotating the spindle motor, but control may be used, in which an interval between insertion of a door key and the starting of an engine is measured to switch over to a solar cell.

Also, in order to raise an ambient temperature to a range of temperature, in which the information recording and reproducing device can be used, it is common that electric power inside and outside a vehicle is used in cold districts to raise and keep temperature. Instead of using a battery on a vehicle, a solar cell can be used to rotate the spindle motor to thereby raise an ambient temperature to a range of usable temperature. Here, in the case where the information recording and reproducing device 19 is outside the range of usable temperature, a heater and a cooler (not shown) provided in the vicinity of the spindle motor 1 may be actuated by electric power outside a vehicle, a battery on a vehicle, and a solar cell prior to the starting of the spindle motor 1 to put the information recording and reproducing device 19 under the circumstance within the range of usable temperature and then start the information recording and reproducing device. At this time, the heater and the cooler may be mounted either inside or outside the information recording and reproducing device 19.

In this manner, according to the embodiment, electric power is fed to the spindle motor in the information recording and reproducing device in the various detecting manners shown in FIG. 5, and such feeding of electric power is essentially effected making use of a battery power source mounted on a vehicle. Also, a solar cell other than such battery power source may be used as described above. Further, in the case of using an acceleration sensor housed in the information recording and reproducing device, the spindle motor may be rotatingly started when shock is detected by the acceleration sensor in a state, in which electric power from a solar cell is always fed to the information recording and reproducing device. Also, the spindle motor may be rotated at all times during the traveling of a vehicle even when the information recording and reproducing device is in non-use.

It is described in the above explanation that micro-movement abrasion in the bearing part is prevented by rotating the spindle motor before or immediately after vibrations due to a vehicle are caused. However, since the same can be said with respect to the bearing part related to rotation of the carriage as well as the spindle motor, it is effective in terms of prevention of micro-movement abrasion to make the forced turning motion of the carriage, for example, carry out the swinging motion from an unload state to a load state.

Also, according to the embodiment of the invention, although not shown, a control means (CPU) is separately provided to control the bearing parts of the information recording and reproducing device shown in FIG. 1 on the basis of detected signals from the various detecting means as shown in FIG. 5 such that the bearing parts are rotatingly started before or immediately after vibrations due to a vehicle are caused. Not being limited to such separately provided control means, the control means described above may be incorporated into the main substrate 11 shown in FIG. 1.

According to the invention, the bearing parts used in rotation and/or rotational drive of the spindle motor and/or the carriage can be prevented from subjecting to micro-movement abrasion to be rapidly degraded in rotating and/or turning accuracy.

Also, it is possible to solve a problem that grease in the spindle motor 1 and an oil in the fluid bearings are increased in viscosity under the circumstance at low temperatures below 0° C. to make starting difficult.

Having described preferred embodiments of the invention with reference to the accompanying drawings, it is to be understood that the invention is not limited to the embodiments and that various changes and modifications could be effected therein by one skilled in the art without departing from the spirit or scope of the invention as defined in the appended claims.

What is claimed is:

1. A control device for an on-board information recording and reproducing device including disk media holding information, a head for recording or reproducing information from the disk media, a carriage turning to position the head on a surface of the disk media, a bearing part permitting the carriage to turn, a spindle motor for rotatingly driving the disk media, and a bearing part of the spindle motor, the control device comprising:
    a controller which starts one of rotation of the bearing part of the spindle motor and swings of the bearing part of the carriage before vehicular vibrations are caused.

2. The control device for an on-board information recording and reproducing device according to claim 1, further comprising:
    detecting means which detects a vehicle operating manner, which is carried out before vehicular vibrations are caused; and
    wherein the vehicle operating manner is one of insertion of a door key, insertion of a starting key, occupation of a seat, opening or closing of a door, and operation of a seat belt.

3. The control device for an on-board information recording and reproducing device according to claim 1, further comprising a solar cell mounted on the vehicle to serve as a power source for starting rotation of the bearing parts.

4. A control device for an on-board information recording and reproducing device comprising disk media holding information, a head for recording or reproducing information from the disk media, a carriage turning to position the head on a surface of the disk media, a bearing part permitting the carriage to turn, a spindle motor for rotatingly driving the disk media, and a bearing part of the spindle motor, the control device comprising:
    an acceleration sensor provided on a vehicle or the information recording and reproducing device;
    detecting means which detects whether an acceleration from the acceleration sensor has exceeded a predetermined value; and
    control means which starts rotation of the bearing part of the spindle motor on the basis of a signal from the detecting means which indicates that the acceleration sensor has exceeded a predetermined value.

5. The control device for an on-board information recording and reproducing device according to claim 4, wherein the acceleration sensor is mounted on a door adjacent to a driver's seat.

6. A control device for an on-board information recording and reproducing device comprising disk media holding information, a head for recording or reproducing information from the disk media, a carriage turning to position the head on a surface of the disk media, a bearing part permitting the carriage to turn, a spindle motor for rotatingly driving the disk media, and a bearing part of the spindle motor, the control device comprising:
    a velocity sensor existing in a vehicle;
    detecting means which detects output from the velocity sensor; and
    control means which continue to rotate the bearing part of the spindle motor during detection of said output.

7. A control method for an on-board information recording and reproducing device including disk media holding information, a head for recording or reproducing information from the disk media, a carriage turning to position the head on a surface of the disk media, a bearing part permitting the carriage to turn, a spindle motor for rotatingly driving the disk media, and a bearing part of the spindle motor, the method comprising the steps of:
    starting one of rotation of the bearing part of the spindle motor and swings of the bearing part of the carriage before vehicular vibrations are caused.

8. A control method for an on-board information recording and reproducing device including disk media holding information, a head for recording or reproducing information from the disk media, a carriage turning to position the head on a surface of the disk media, a bearing part permitting the carriage to turn, a spindle motor for rotatingly driving the disk media, and a bearing part of the spindle motor, the method comprising the steps of:

detecting, by means of an acceleration sensor provided on a vehicle or the information recording and reproducing device, whether acceleration has exceeded a predetermined value; and starting rotation of the bearing part of the spindle motor on the basis of the detection.

9. A control method for an on-board information recording and reproducing device including disk media holding information, a head for recording or reproducing information from the disk media, a carriage turning to position the head on a surface of the disk media, a bearing part permitting the carriage to turn, a spindle motor for rotatingly driving the disk media, and a bearing part of the spindle motor, the method comprising the steps of:

detecting an output from a velocity sensor; and continuing to rotate the bearing part of the spindle motor during detection of said output.

* * * * *